United States Patent
Mallik et al.

(10) Patent No.: US 8,379,705 B2
(45) Date of Patent: Feb. 19, 2013

(54) HIERARCHICAL FEEDBACK OF CHANNEL STATE INFORMATION FOR WIRELESS COMMUNICATION

(75) Inventors: Siddhartha Mallik, San Diego, CA (US); Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 12/849,230

(22) Filed: Aug. 3, 2010

(65) Prior Publication Data

US 2011/0206106 A1 Aug. 25, 2011

Related U.S. Application Data

(60) Provisional application No. 61/231,131, filed on Aug. 4, 2009.

(51) Int. Cl.
*H04B 3/46* (2006.01)

(52) U.S. Cl. ......... 375/226; 375/224; 375/267; 370/328

(58) Field of Classification Search .................. 455/450; 375/226, 224, 267, 295
See application file for complete search history.

(56) References Cited

U.S. PATENT DOCUMENTS 6,738,020 B1   5/2004   Lindskog et al.

FOREIGN PATENT DOCUMENTS

EP   1079543 A1   2/2001

OTHER PUBLICATIONS

International Search Report and Written Opinion—PCT/US2010/044456, International Search Authority—European Patent Office—Mar. 21, 2011.
John F an Ed—Carmine Di Menna, et al., "Performance Analysis of Orthogonal Transmit Diversity Over Intra-Cell Interference in WCDMA Downlinks", 16TH 1ST Mobile and Wireless Communications Summit, 2007 IEEE Piscataway, NJ, USA, Jul. 1, 2007, pp. 1-6, XP031132365, DOI: DOI:10.1109/1STMWC.2007.4299192 ISBN: 978-1-4244-1662-2 Section III.
Qualcomm Europe: "Hierarchical feedback in support of downlink CoMP operation", 3GPP Draft, R1-091455 Hierarchical Feedback in Support of DL Comp Operation, 3rd Generation Partnership Project (3GPP), Mobile Competence Centre, 650, Route Des Lucioles, F-06921 Sophia-Antipolis Cedex, France, no. Seoul, Korea, 20090318, Mar. 18, 2009, XP050339022, [retrieved on Mar. 18, 2009].

*Primary Examiner* — David Q Nguyen
(74) *Attorney, Agent, or Firm* — Florin C. Corie; Kenyon S. Jenckes

(57) ABSTRACT

Techniques for sending hierarchical feedback of channel state information are described. In one design, a user equipment (UE) determines channel gain information for multiple cells selectable to transmit data to the UE. The UE also determines intra-cell relative phase information for at least one cell among the multiple cells. The UE reports the channel gain information and the intra-cell relative phase information. The channel gain information may include multiple quantized channel vectors for each of the multiple cells. The intra-cell relative phase information may indicate phase errors in the quantized channel vectors for each of the at least one cell. The UE may also determine and report other information. The UE may receive data from one or more cells among the plurality of cells. Each cell may transmit data based on at least one transmit vector determined based on the channel gain information and the intra-cell relative phase information.

39 Claims, 7 Drawing Sheets

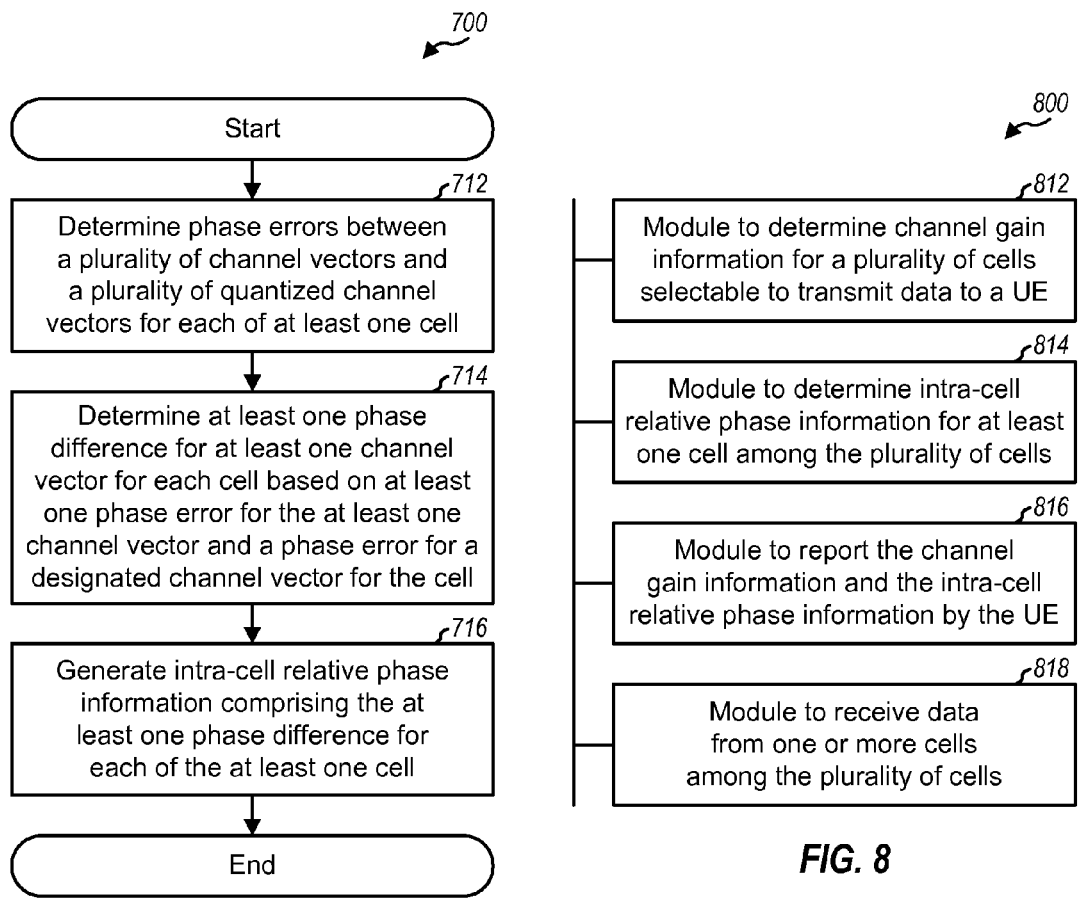

HIERARCHICAL FEEDBACK OF CHANNEL STATE INFORMATION FOR WIRELESS COMMUNICATION

The present application claims priority to provisional U.S. Application Ser. No. 61/231,131, entitled "HIERARCHICAL CHANNEL FEEDBACK ALGORITHM FOR INTERFERENCE ALIGNMENT INFORMATION," filed Aug. 4, 2009, assigned to the assignee hereof and incorporated herein by reference.

BACKGROUND

I. Field

The present disclosure relates generally to communication, and more specifically to techniques for supporting data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may be within the coverage of multiple cells, where the term "cell" can refer to a coverage area of a base station and/or a base station subsystem serving the coverage area. One or more of the multiple cells may be selected to serve the UE. It may be desirable for the selected cell(s) to transmit data to the UE in a manner that can provide good performance.

SUMMARY

Techniques for sending hierarchical feedback of channel state information are described herein. For hierarchical feedback, the channel state information may be decomposed into different components such as channel gain information, amplitude information, inter-cell relative channel gain information, intra-cell relative phase information, long-term channel gains, etc. The channel state information may thus include (i) intra-cell channel information comprising the channel gain information, the amplitude information, the intra-cell relative phase information, and the long-term channel gains, and (ii) inter-cell channel information comprising the inter-cell relative channel gain information. These different components may be separately quantized and reported. The reported channel state information may be used to transmit data to obtain good performance.

In one design, a UE may determine channel gain information for a plurality of cells selectable to transmit data to the UE. The UE may also determine intra-cell relative phase information for at least one cell among the plurality of cells. The UE may report the channel gain information and the intra-cell relative phase information. The channel gain information may comprise a plurality of quantized channel vectors for each of the plurality of cells. The intra-cell relative phase information may be indicative of phase errors in the plurality of quantized channel vectors for each of the at least one cell. The UE may also determine and report other information for the plurality of cells. The UE may receive data from one or more cells among the plurality of cells. Each cell may transmit data based on at least one transmit vector, which may be determined based on the channel gain information and the intra-cell relative phase information for that cell. For interference alignment, multiple cells may transmit data based on transmit vectors selected to align interference from these cells at the UE.

In one design, a cell may receive channel gain information and intra-cell relative phase information for the cell from the UE. The cell may also receive other information from the UE. The cell may generate a reconstructed channel matrix based on the channel gain information, the intra-cell relative phase information, and/or other information. The cell may determine at least one transmit vector based on the reconstructed channel matrix and may precode data based on the transmit vector(s). In one design, the data may be intended for the UE, and the transmit vector(s) may steer the data toward the UE. In another design, the data may be intended for at least one other UE, and the transmit vector(s) may align interference from the cell with interference from at least one other cell at the UE.

Various aspects and features of the disclosure are described in further detail below.

BRIEF DESCRIPTION OF THE DRAWINGS

FIG. 3 shows determination of different channel state information components.

FIGS. 4 and 8 show a process and an apparatus, respectively, for sending hierarchical feedback of channel state information.

FIG. 7 shows a process for determining intra-cell relative phase information.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
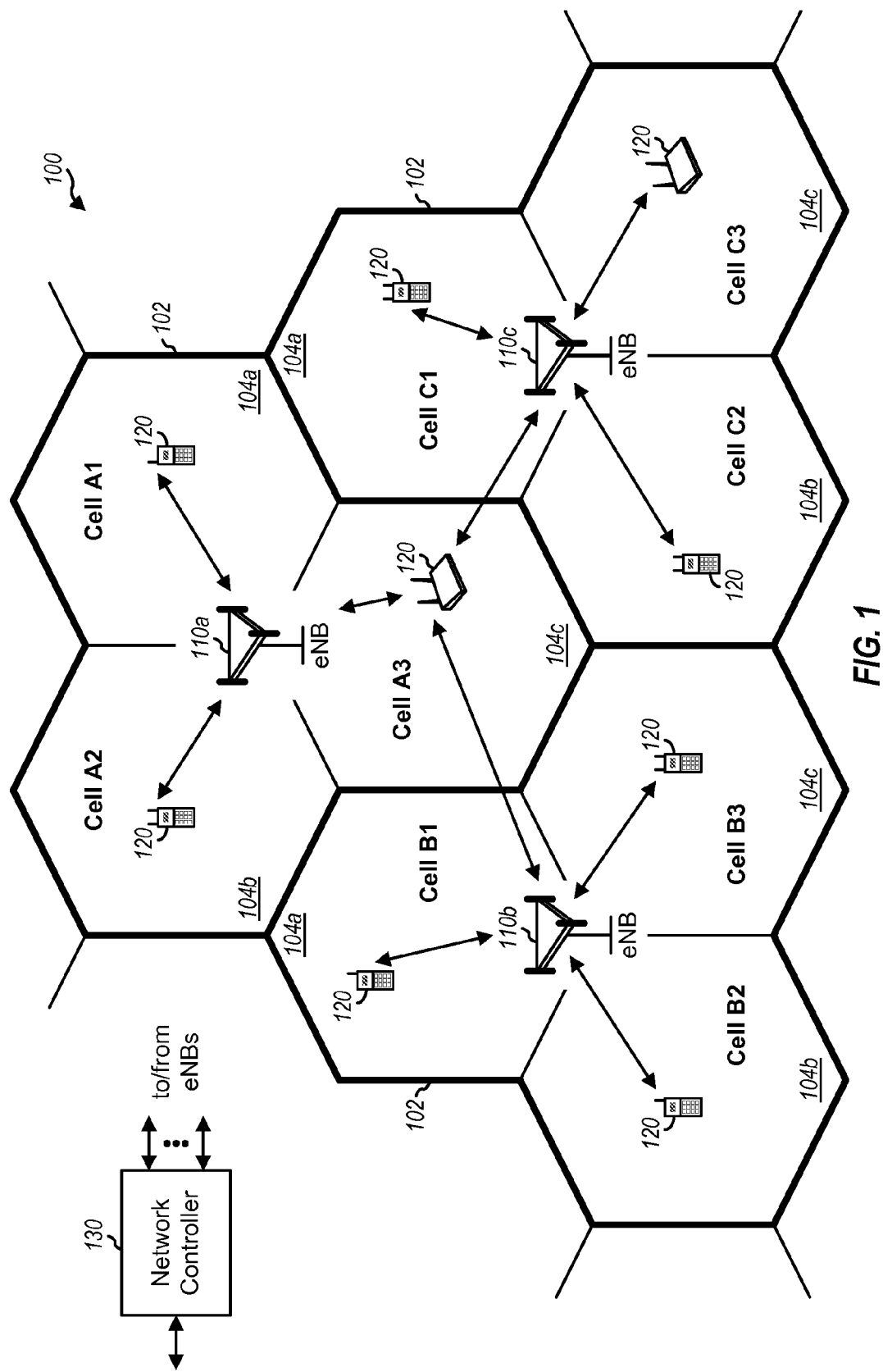
FIG. 1 shows a wireless communication network.

FIG. 1 shows a wireless communication network 100, which may be an LTE network or some other wireless network. Network 100 may include a number of evolved Node Bs (eNBs) and other network entities that can support communication for a number of UEs. For simplicity, only three eNBs 110a, 110b and 110c and one network controller 130 are shown in FIG. 1. An eNB may be an entity that communicates with the UEs and may also be referred to as a base station, a Node B, an access point, etc. Each eNB 110 may provide communication coverage for a particular geographic area 102. To improve network capacity, the overall coverage area of an eNB may be partitioned into multiple smaller areas, e.g., three smaller areas 104a, 104b and 104c. Each smaller area may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, an eNB may support one or multiple (e.g., three) cells.

Network controller 130 may couple to a set of eNBs and may provide coordination and control for these eNBs. Network controller 130 may comprise a Mobile Management Entity (MME) and/or some other network entity.

A number of UEs may be dispersed throughout the wireless network, and each UE may be stationary or mobile. For simplicity, FIG. 1 shows only one UE 120 in each cell. A UE may also be referred to as a terminal, a mobile station, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB/cell via the downlink and uplink. The downlink (or forward link) refers to the communication link from the eNB/cell to the UE, and the uplink (or reverse link) refers to the communication link from the UE to the eNB/cell.

Network 100 may support Coordinated MultiPoint (CoMP) transmission in which multiple cells may simultaneously transmit data to one or more UEs on the same time-frequency resources. CoMP may include the following:

1. Joint processing (JP)—multi-point transmission of data from multiple cells to one or more UEs with antenna weights at different cells being selected to simultaneous achieve coherent channel combining at a target UE and transmit interference nulling to one or more interfered UEs. Joint processing utilizes full channel state information for all antennas at all cooperating cells.
2. Cooperative beamforming (CB)—single-point transmission of data from a cell equipped with multiple antennas to a target UE using transmit beam(s) selected by trading between precoding gain to the target UE and interference reduction to an interfered UE served by a neighbor cell. Cooperative beamforming utilizes knowledge of spatial channel corresponding to each cooperating cell. However, short-term knowledge of the channel across different cells is not needed.

Figure 2:
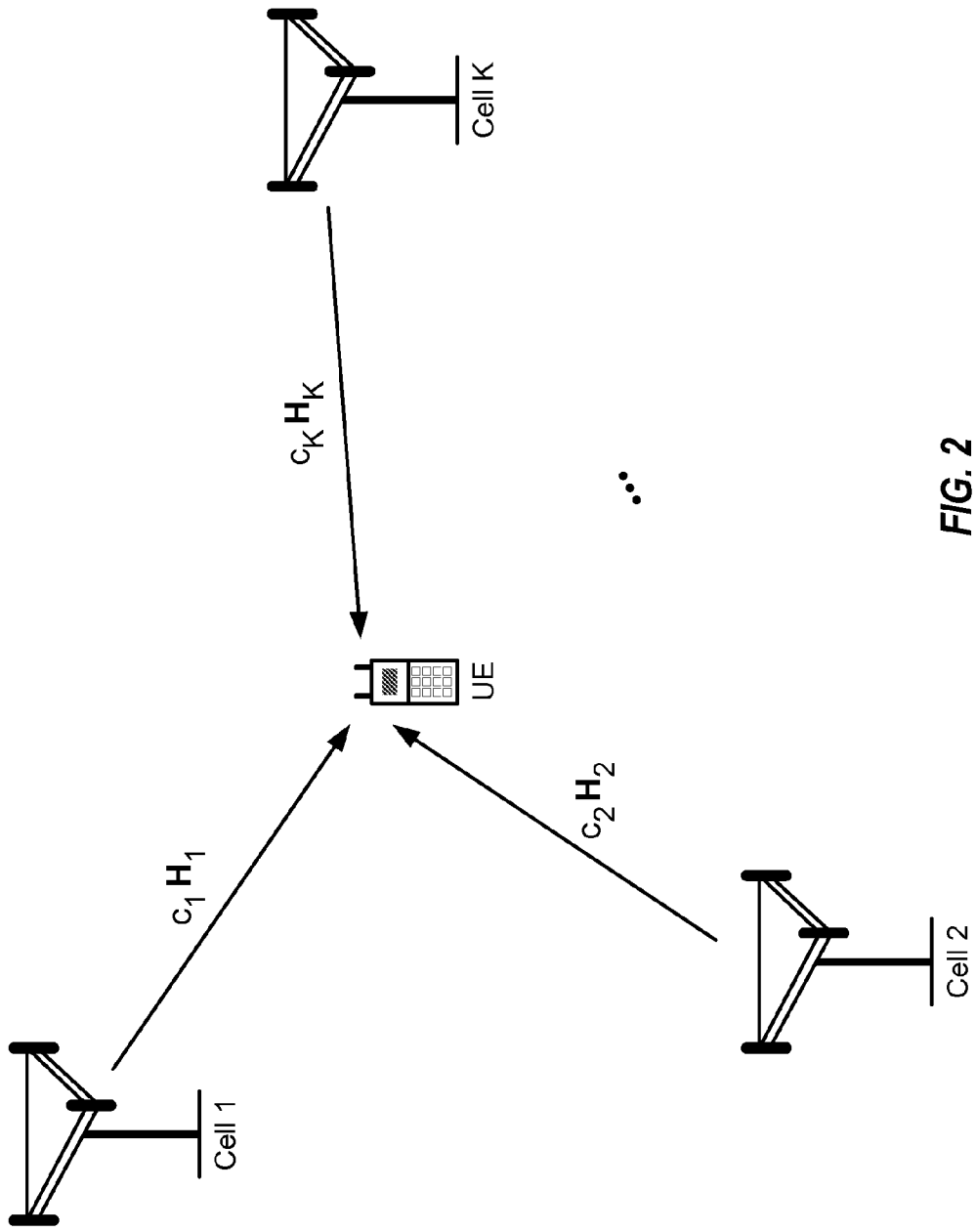
FIG. 2 shows transmission from multiple cells to a single UE.

FIG. 2 shows an example of CoMP transmission from multiple (K) cells to a single UE. The K cells may belong to the same eNB or different eNBs and may be part of a CoMP set for the UE. The UE may provide channel state information for the K cells. The UE may be served by either multi-point transmission (joint processing) or single-point transmission (cooperative beamforming) by all or a subset of the K cells.

As shown in FIG. 2, the response of the wireless channel from each cell k to the UE may be given as $c_k H_k$, where $H_k$ is an $R \times T_k$ channel matrix for cell k, $c_k$ is a long-term channel gain for cell k, $T_k$ is the number of transmit antennas at cell k, R is the number of receive antennas at the UE, and $k \in \{1, \ldots, K\}$. $H_k$ includes channel gains that represent the short-term fading between the $T_k$ transmit antennas at cell k and the R receive antennas at the UE, where in general $R \geq 1$ and $T_k \geq 1$. $c_k$ represents the long-term pathloss and shadow fading between cell k and the UE. There may be non-negligible difference between the long-term channel gains for different cells in the CoMP set.

To support multi-point transmission from multiple cells to the UE, the UE may report an overall channel matrix H, which may be expressed as:

$$H = [c_1 H_1, c_2 H_2, \ldots, c_K H_K]. \quad \text{Eq (1)}$$

The overall channel matrix H captures amplitude and phase information that may be used for inter-cell beamforming and/or transmit interference nulling across cells. This amplitude and phase information may be pertinent for multi-point transmission to the UE.

To support single-point transmission from a single cell to the UE, the UE may report channel matrices $H_1$ through $H_K$ to cells 1 through K, respectively. The serving cell for the UE may use its channel matrix to steer its data transmission toward the UE. Each non-serving cell may use its channel matrix to steer its data transmission away from the UE in order to reduce interference to the UE.

The UE may send channel state information for the cells in the CoMP set using hierarchical feedback. For hierarchical feedback, the channel state information may be decomposed into different components that may be separately quantized and reported. This may provide certain advantages, as described below.

Table 1 lists different components of channel state information (CSI) that may be reported with hierarchical feedback. Each channel state information component is described in detail below.

TABLE 1

Components of Channel State Information

| CSI Component | | Description |
|---|---|---|
| Channel Gain Information | Per-stream Intra-cell Short-term Component | Indicative of channel gains between the transmit antennas at different cells and the receive antennas at a UE. |
| Amplitude Information | Per-stream Intra-cell Short-term Component | Indicative of amplitude of each channel vector for a cell. |
| Inter-cell Relative Channel Gain Information | Per-stream Inter-cell Short-term Component | Indicative of differences in channel gain (amplitude and phase) across different cells. |
| Intra-cell Relative Phase Information | Inter-stream Intra-cell Short-term Component | Indicative of phase errors in the quantized channel vectors for each cell. |
| Long-term Channel Gain | Per-stream Inter-cell Long-term Component | Indicative of a long-term channel gain for each cell. |

The channel state information may thus include (i) intra-cell channel information comprising the channel gain information, the amplitude information, the intra-cell relative phase information, and the long-term channel gain, and (ii) inter-cell channel information comprising the inter-cell relative channel gain information. The channel state information may also be considered as including per-stream intra-cell short-term component, per-stream inter-cell short-term component, per-stream inter-cell long-term component, and inter-stream intra-cell short-term component, which are described below.

Table 2 lists the notation used in much of the description below. In the description herein, k is an index for the cells in the CoMP set and ranges from 1 to K, and r is an index for the antennas at the UE and ranges from 1 to R. The vectors and matrices in Table 2 are described in detail below. Each matrix may be obtained by stacking R corresponding vectors. For example, the channel matrix $H_k$ for cell k may be obtained by stacking R channel vectors for the R receive antennas at the UE, or $H_k=[h_k(1), \ldots, h_k(R)]$.

TABLE 2

| | |
|---|---|
| Channel vector $h_k(r)$ or $g_k(r)$ | Channel matrix $H_k$ or $G_k$ |
| Measured channel vector $h_k(r)$ | Measured channel matrix $H_k$ |
| Equivalent channel vector $g_k(r)$ | Equivalent channel matrix $G_k$ |
| Quantized channel vector $w_k(r)$ | Quantized channel matrix $W_k$ |
| Relative channel gain vector $v(r)$ | Relative channel gain matrix V |
| Reconstructed channel vector $\tilde{h}_k(r)$ or $\tilde{g}_k(r)$ | Reconstructed channel matrix $\tilde{H}_k$ or $\tilde{G}_k$ |

In a first design of hierarchical feedback, which is also referred to as hierarchical channel feedback, the UE may decompose the overall channel matrix H into K scalar channel gains $c_1$ through $c_K$, K channel matrices $H_1$ through $H_K$, and K relative channel gain vectors. The UE may then send a separate report for the channel state information for each cell.

The UE may quantize the channel matrix $H_k$ for each cell as follows. The channel matrix $H_k$ includes R rows corresponding to R measured channel vectors $h_k(1)$ through $h_k(R)$ for the R receive antennas at the UE. A per-cell codebook $C_P$ may be used to quantize each row of the channel matrix $H_k$ and may include a number of channel vectors. Each channel vector in the codebook $C_P$ may be assigned a unique index. Each measured channel vector in the channel matrix $H_k$ may be quantized to one channel vector in the codebook $C_P$ as follows:

$$w_k(r) = \arg\min_{w \in C_P} d(w, h_k(r)), \text{ for } r = 1, \ldots, R, \quad \text{Eq (2)}$$

where d (,) is a metric such as a normalized correlation $$d(w, h_k(r)) = \frac{|w * h_k(r)|}{\|w\| \|h_k(r)\|},$$

$h_k(r)$ is a measured channel vector corresponding to the r-th row of $H_k$, and $w_k(r)$ is a quantized channel vector for $h_k(r)$.

As shown in equation (2), the measured channel vector $h_k(r)$ may be evaluated against each channel vector in the codebook $C_P$. The channel vector in the codebook $C_P$ with the best metric may be selected as the quantized channel vector $w_k(r)$ for the measured channel vector $h_k(r)$.

The UE may determine the relative channel gains for the K cells in the CoMP set. An inter-cell codebook $C_\theta$ may be used to quantize the relative channel gains and may include a number of relative channel gain vectors. Each relative channel gain channel vector in the codebook $C_\theta$ may be assigned a unique index. The UE may determine the relative channel gains for the K measured channel vectors for the K cells for each receive antenna at the UE, as follows:

$$v(r) = \arg\min_{v \in C_\theta} d(v \circ w(r), h(r)), \text{ for } r = 1, \ldots, R, \quad \text{Eq (3)}$$

where $h(r)=[c_1 h_1(r), \ldots, c_K h_K(r)]$ is an extended vector containing K scaled measured channel vectors for the K cells for antenna r at the UE, $w(r)=[c_1 w_1(r), \ldots, c_K w_K(r)]$ is an extended vector containing scaled quantized channel vectors for the K cells for antenna r at the UE, $v=[v_1, \ldots, v_K]$ is a vector with K relative channel gains for the K cells, $v \circ w_1(r)=[v_1 c_1 w_1(r), \ldots, v_K c_K w_K(r)]$, and $v(r)$ is a relative channel gain vector for antenna r at the UE.

As shown in equation (3), the measured channel vectors for antenna r in the extended vector h(r) may be evaluated against the corresponding quantized channel vectors in the extended vector w(r) for each relative channel gain vector v in the codebook $C_\theta$. Each vector v includes K gains for the K cells, which are indicative of the relative channel gains between the K cells. The relative channel gain vector in the codebook $C_\theta$ with the best metric may be selected as a quantized vector of relative channel gains for antenna r. The process may be repeated for each of the R antennas at the UE (i.e., for the R rows of the channel matrices) to obtain R quantized relative channel gain vectors v(1) through v(R) for the R antennas.

The UE may report (i) the indices of the R quantized channel vectors $w_k(1)$ through $w_k(R)$ obtained for each channel matrix $H_k$ and (ii) the indices of the R quantized relative channel gain vectors v(1) through v(R) obtained for the R rows of the channel matrices. If normalized correlation is used as the metric, as shown in equation (2), then the channel vectors in codebook $C_P$ may be defined to have unit norm/magnitude, or $\|w\|=1$. The norm $\|h_k(r)\|$ of each measured channel vector may or may not be reported. If the norm is reported, then the feedback may be referred to as hierarchical channel feedback with amplitude information. If the norm is not reported, then the feedback may be referred to as hierarchical channel feedback without amplitude information.

The UE may quantize and report the K measured channel matrices for the K cells in the CoMP set, as described above. Alternatively, the UE may report the eigenvectors for the eigenmodes of the channels for the K cell, which may be referred to as eigen-feedback. For conventional eigen-feedback, the UE may perform singular value decomposition of the overall channel matrix as follows:

$$H = U\Sigma V^H, \quad \text{Eq (4)}$$

where

U is a unitary matrix of left eigenvectors of H,

V is a unitary matrix of right eigenvectors of H, $\Sigma$ is a diagonal matrix of singular values of H, and "H" denotes a Hermetian or conjugate transpose.

A unitary matrix has columns that are orthogonal to one another, and each column has unit power. A diagonal matrix has possible non-zero values along the diagonal and zeros elsewhere. Matrix V may also be referred to as a transmit matrix and may be used to precode data prior to transmission. Transmit matrix V may also be obtained by performing eigenvalue decomposition of a covariance matrix of H. The eigenvalue decomposition may be expressed as $H^H H = V \Lambda V^H$, where $\Lambda$ is a diagonal matrix of eigenvalues of H.

The K cells may perform precoding with the transmit matrix V in order to transmit data on the eigenmodes of H to the UE. The eigenmodes may be viewed as orthogonal spatial channels and may also be referred to as layers. The singular values in $\Sigma$ are indicative of the channel gains of the eigenmodes of H. The cells may transmit up to R data streams on up to R eigenmodes/layers using up to R columns of the transmit matrix V. Good performance may be achieved by transmitting data on the eigenmodes of H.

The UE may quantize the M best eigenvectors in V corresponding to the M largest singular values in $\Sigma$ (e.g., based on a codebook), where M is the highest rank supported by the UE and $M \leq R$. The UE may report the M quantized eigenvectors and the M corresponding singular values. The amount of channel state information to report may be reduced if M is less than R.

In a second design of hierarchical feedback, which is also referred to as hierarchical eigen-feedback, the UE may decompose the channel matrix for the serving cell to obtain a matrix of eigenvectors for the serving cell. The UE may then obtain K scalar channel gains $c_1$ through $c_K$, K equivalent channel matrices $G_1$ through $G_K$, and K relative channel gain vectors. The UE may then send a separate report for the channel state information for each cell.

In the following description, cell 1 may be assumed to be the serving cell for the UE and may transmit data to the UE for single-point transmission. The UE may also send feedback to only the serving cell or to each cell in the CoMP set. The UE may perform singular value decomposition of the channel matrix $H_1$ for the serving cell, as follows:

$$H_1 = U_1 \Sigma_1 V_1^H, \qquad \text{Eq (5)}$$

where
 $U_1$ is a unitary matrix of left eigenvectors of $H_1$,
 $V_1$ is a unitary matrix of right eigenvectors of $H_1$, and
 $\Sigma_1$ is a diagonal matrix of singular values of $H_1$.

An equivalent channel matrix $G_k$ may be defined for each cell in the CoMP set as follows:

$$G_k = U_1^H H_k, \text{ for } k=1, \ldots, K. \qquad \text{Eq (6)}$$

The UE may quantize the equivalent channel matrix $G_k$ for each cell. The equivalent channel matrix $G_k$ includes R rows corresponding to R equivalent channel vectors $g_k(1)$ through $g_k(R)$. Each row of the equivalent channel matrix $G_k$ may be quantized to one channel vector in codebook $C_P$ as follows:

$$w_k(r) = \arg\min_{w \in C_P} d(w, g_k(r)), \text{ for } r = 1, \ldots, R, \qquad \text{Eq (7)}$$

where
 $g_k(r)$ is an equivalent channel vector for the r-th row of $G_k$, and
 $w_k(r)$ is a quantized channel vector for $g_k(r)$.

As shown in equation (7), the equivalent channel vector $g_k(r)$ may be evaluated against each channel vector in the codebook $C_P$. The channel vector in the codebook $C_P$ with the best metric may be selected as the quantized channel vector for the equivalent channel vector $g_k(r)$.

The UE may determine the relative channel gains for each row of the K equivalent channel matrices for the K cells as follows:

$$v(r) = \arg\min_{v \in C_\theta} d(v \circ w(r), g(r)), \text{ for } r = 1, \ldots, R, \qquad \text{Eq (8)}$$

where
 $g(r) = [c_1 g_1(r), \ldots, c_K g_K(r)]$ is an extended vector containing the K scaled equivalent channel vectors for the r-th row of the K equivalent channel matrices,
 $w(r) = [c_1 w_1(r), \ldots, c_K w_K(r)]$,
 $v = [v_1, \ldots, v_K]$ is a vector with K relative channel gains for the K cells,
 $v \circ w_1(r) = [v_1 c_1 w_1(r), \ldots, v_K c_K w_K(r)]$, and
 $v(r)$ is a relative channel gain vector for the r-th row.

As shown in equation (8), the equivalent channel vectors for the r-th row of the K equivalent channel matrices in the extended vector g(r) may be evaluated against the corresponding quantized channel vectors in the extended vector w(r) for each relative channel gain vector v in the codebook $C_\theta$. The relative channel gain vector in the codebook $C_\theta$ with the best metric may be selected as a quantized vector of relative channel gains for the r-th row of the K equivalent channel matrices. The process may be repeated for each of the R rows of the equivalent channel matrices to obtain R relative channel gain vectors v(1) through v(R) for the R rows.

For hierarchical eigen-feedback, the UE may report (i) the indices of the R quantized channel vectors $w_k(1)$ through $w_k(R)$ obtained for each equivalent channel matrix $G_k$ and (ii) the indices of the R quantized relative channel gain vectors v(1) through v(R). Hierarchical eigen-feedback may be considered as feedback of an equivalent channel under an assumption that the UE uses a receiver that is matched to the channel $H_1$ of the serving cell.

If the codebook $C_P$ includes unit norm channel vectors, then the norm $\|g_k(r)\|$ of each row of each equivalent channel matrix may be reported, for example, as part of a channel quality indicator (CQI) report. If the norm is reported, then the feedback may be referred to as hierarchical eigen-feedback with amplitude information. The UE may also skip reporting the norm, for example, for single-point transmission such as cooperative beamforming. If the norm is not reported, then the feedback may be referred to as hierarchical eigen-feedback without amplitude information.

For conventional eigen-feedback, the transmit matrix V in equation (4) may be recomputed whenever the CoMP set changes. All cells in the CoMP set may then be updated with the new transmit vector. This is due to the matrix U, the unitary matrix of left eigenvectors of H, being dependent on the channel matrices of all cells in the CoMP set.

For hierarchical eigen-feedback, the channel vectors for the cells in the CoMP set do not need to be recomputed whenever the CoMP set changes. If a new cell is added to the CoMP set, then the equivalent channel vectors for the existing cells in the CoMP set do not need to be recomputed since they are only dependent on the unitary matrix $U_1$ of the serving cell. Only an equivalent channel matrix $G_{K+1} = U_1^H H_{K+1}$ for the new cell K+1 may be computed. Quantized channel vectors for the new cell may then be obtained based on the equivalent channel matrix and reported. The relative channel gain vectors may be recomputed and reported whenever the CoMP set changes. Hierarchical eigen-feedback may thus have less computation and less feedback than conventional eigen-feedback.

The first and second hierarchical feedback designs described above may not provide sufficient channel state information to enable interference alignment for the UE. For interference alignment, multiple non-serving cells may transmit data to their UEs such that the interference caused to the UE is aligned at the UE. Non-serving cells i and j may align their interference by choosing their transmit vectors $b_i$ and $b_j$, respectively, to serve their UEs such that the following condition is satisfied:

$$H_i b_i = \alpha H_j b_j \text{ or } G_i b_i = \alpha G_j b_j, \qquad \text{Eq (9)}$$

where $\alpha$ is an arbitrary scalar.

As shown in equation (9), the transmit vectors $b_i$ and $b_j$ may be selected such that the resultant beams from cells i and j are approximately aligned at the UE. However, cells i and j would need sufficient channel state information in order to select the transmit vectors $b_i$ and $b_j$ for interference alignment.

The UE may report (i) a quantized channel matrix $W_i$ and a diagonal matrix $D_i$ of channel norms for cell i and (ii) a quantized channel matrix $W_j$ and a diagonal matrix $D_j$ of channel norms for cell j. The quantized channel matrix $W_k$ for each cell k may be obtained by stacking the R quantized channel vectors for cell k and may be given as $W_k = [w_k(1), \ldots, w_k(R)]$. The diagonal matrix $D_k$ for each cell k may include R diagonal elements $d_1$ through $d_R$, with the r-th diagonal element being an estimate of either (i) the norm of the r-th row of the measured channel matrix $H_k$ for cell k so that $d_k(r) = \|h_k(r)\|$, or (ii) the norm of the r-th row of the equivalent channel matrix $G_k$ for cell k so that $d_k(r) = \|g_k(r)\|$.

Cells i and j may select their transmit vectors based on their quantized channel matrices and their channel norm matrices such that $D_i W_i b_i = \alpha D_j W_j b_j$. Amplitude information (contained in diagonal matrices $D_i$ and $D_j$) is needed for interference alignment since $W_i b_i = \alpha W_j b_j$ in general does not imply that $D_i W_i b_i = \alpha D_j W_j b_j$, which is needed for interference alignment.

If normalized correlation is used as a metric for quantization, then the quantization may introduce arbitrary phase ambiguities in the quantized channel matrices. This is because $d(w, h_k(r)) = d(w, h_k(r) \cdot e^{j\theta})$ for any arbitrary phase $\theta$. The phase error $\theta_{kr}$ between (i) the measured channel vector $h_k(r)$ or the equivalent channel vector $g_k(r)$ and (ii) the corresponding quantized channel vector $w_k(r)$ may be expressed as:

$$\theta_{kr} = \arctan\{h_k^H(r) w_k(r)\}, \text{ or} \qquad \text{Eq (10)}$$

$$\theta_{kr} = \arctan\{g_k^H(r) w_k(r)\}. \qquad \text{Eq (11)}$$

The phase error $\theta_{kr}$ may have an arbitrary value between 0 and $2\pi$ and may prevent interference alignment even if amplitude information is reported.

The problem of phase ambiguity on interference alignment may be illustrated by an example. In this example, the feedback from the UE may be assumed to have no quantization errors and only phase ambiguity. The UE may report $P_i H_i$ to cell i and $P_j H_j$ to cell j, where $P_i$ and $P_j$ are square diagonal matrices with unit norm complex-valued entries representing the phase errors introduced due to quantization. As an example, for the case of two receive antennas at the UE, $P_i$ may be given as $$P_i = \begin{bmatrix} e^{j\theta_{i1}} & 0 \\ 0 & e^{j\theta_{i2}} \end{bmatrix},$$

and $P_j$ may be given as $$P_j = \begin{bmatrix} e^{j\theta_{j1}} & 0 \\ 0 & e^{j\theta_{j2}} \end{bmatrix}.$$

Cells i and j may select their transmit vectors $b_i$ and $b_j$ based on $P_i H_i$ and $P_j H_j$, respectively, such that $P_i H_i b_i = \alpha P_j H_j b_j$. However, cells i and j may not achieve interference alignment since $P_i H_i b_i = \alpha P_j H_j b_j$ in general does not imply that $H_i b_i = \alpha H_j b_j$. Interference alignment may be achieved if the UE also reports a complex-valued scalar $e^{j(\theta_{i1} - \theta_{i2})}$ to cell i and a complex-valued scalar $e^{j(\theta_{j1} - \theta_{j2})}$ to cell j.

In an aspect, the UE may report intra-cell relative phase information between different channel vectors for each cell that will perform interference alignment for the UE. In one design, the UE may report complex-valued scalars that capture the intra-cell relative phase information. The UE may determine the phase error for each channel vector for each cell, e.g., as shown in equation (10) or (11). The UE may then determine the complex-valued scalars for the intra-cell relative phase information for each cell as follows:

$$s_{kr} = e^{j(\theta_{k1} - \theta_{kr})}, \text{ for } r = 1, \ldots, R, \qquad \text{Eq (12)}$$

where $s_{kr}$ is a complex-valued scalar for the intra-cell relative phase information between antenna r and antenna 1 at the UE for cell k.

Alternatively, the UE may determine phase differences for the intra-cell relative phase information for each cell as follows:

$$\Delta\theta_{kr} = \theta_{k1} - \theta_{kr}, \text{ for } r = 1, \ldots, R \qquad \text{Eq (13)}$$

where $\Delta\theta_{kr}$ is a phase difference for the intra-cell relative phase information between antenna r and antenna 1 at the UE for cell k.

In the designs shown in equations (12) and (13), the phase of the first row may be used as a reference. The phase of reach remaining row may be compared against the phase of the first row. The relative phase may also be determined in other manners. The UE may report the complex-valued scalars or the phase differences for the intra-cell relative phase information as well as other channel state information to each cell.

Each cell may receive its quantized channel matrix $W_k$, its diagonal matrix $D_k$ of channel norms, and the complex-valued scalars for the intra-cell relative phase information. The quantized channel matrix $W_k$ may be derived based on the measured channel matrix $H_k$ or the equivalent channel matrix $G_k$. The non-serving cells may then have sufficient information to align their interference at the UE. For example, cells i and j may select their transmit vectors $b_i$ and $b_j$ such that $\overline{D}_i W_i b_i = \alpha \overline{D}_j W_j b_j$, where $\overline{D}_i$ and $\overline{D}_j$ are square diagonal matrices that include both the amplitude information and the intra-cell relative phase information. In particular, $\overline{D}_k$ for each cell k may include R diagonal elements, with the r-th diagonal element being given as $d_k(r) \cdot e^{j(\theta_{k1} - \theta_{kr})}$, for $r = 1, \ldots, R$. Selection of the transmit vectors $b_i$ and $b_j$ based on the intra-cell relative phase information may enable interference alignment at the UE, assuming that the codebook $C_P$ is selected such that residual quantization error is sufficiently small.

Figures 3, 4:
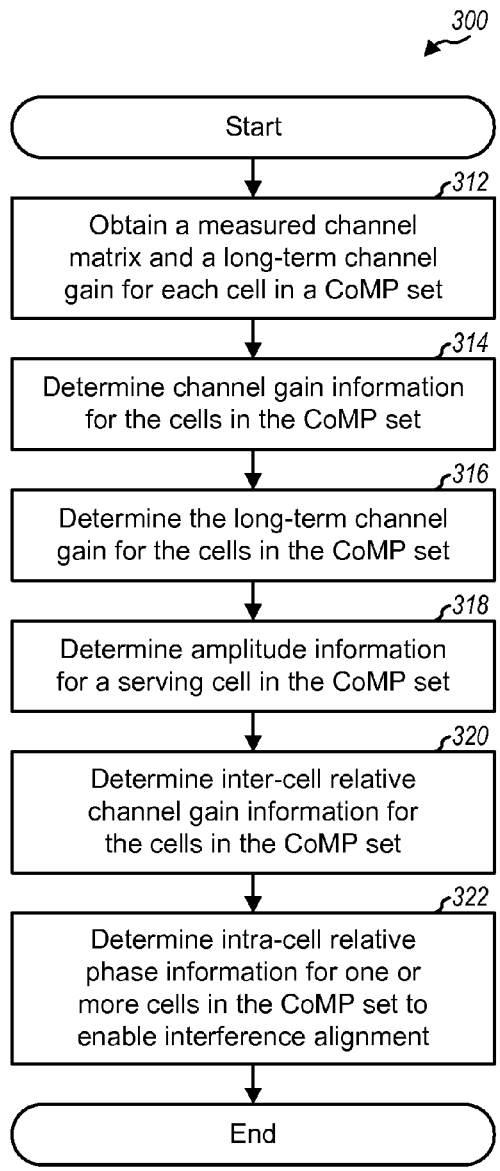

FIG. 3 shows a design of a process 300 for hierarchical feedback of channel state information to support multi-point transmission and interference alignment. The UE may obtain a measured channel matrix $H_k$ and a long-term channel gain $c_k$ for each cell k in its CoMP set (block 312). The UE may perform channel estimation for each cell based on a reference signal transmitted by that cell to obtain the measured channel matrix and the long-term channel gain for the cell.

The UE may determine channel gain information for the cells in the CoMP set (block 314). The channel gain information may comprise a quantized channel matrix $W_k$ for each cell in the CoMP set. In one design, the quantized channel matrix for each cell may be obtained by quantizing each row of the measured channel matrix $H_k$ for that cell based on a codebook, e.g., as shown in equation (3). In another design, the quantized channel matrix for each cell may be obtained by deriving an equivalent channel matrix $G_k$ for that cell (e.g., as shown in equation (6)) and quantizing each row of the equivalent channel matrix based on a codebook, e.g., as shown in equation (7).

The UE may determine the long-term channel gain $c_k$ for each cell k, for example, by averaging the received power of each cell at the UE (block 316). The UE may determine amplitude information for a serving cell (or some other designated cell) in the CoMP set for hierarchical feedback with amplitude information (block 318). The amplitude information may comprise quantized channel norms for the serving cell. For hierarchical channel feedback, the UE may determine the channel norm $\|h_k(r)\|$ of each row of the measured channel matrix $H_k$ for the serving cell. For hierarchical eigen-feedback, the UE may determine the channel norm $\|g_k(r)\|$ of each row of the equivalent channel matrix $G_k$ for the serving cell. In either case, the UE may quantize and report the channel norm for each row of $H_k$ or $G_k$. Furthermore, for eigen-feedback, the product $c_k \cdot \|g_k(r)\|$ may be reported in the CQI for layer r. The channel norms of each non-serving cell may be derived based on the channel norms of the serving cell and the relative channel gain vector v(r).

The UE may determine inter-cell relative channel gain information for the cells in the CoMP set (block 320). The inter-cell relative channel gain information may comprise one or more relative channel gain vectors v(r) for one or more rows of the quantized channel matrices. The relative channel gain vector v(r) for each row r may be indicative of the relative gains between different cells for row r of the quantized channel matrices and may be determined as shown in equation (3) or (8). For hierarchical channel feedback, R relative channel gain vectors may be computed for the R rows of the measured channel matrices $H_k$. For hierarchical eigen-feedback, M relative channel gain vectors may be computed for M best rows of the equivalent channel matrices $G_k$, where M is the number of layers to use for transmission to the UE and in general $1 \leq M \leq R$.

The UE may determine intra-cell relative phase information for one or more cells in the CoMP set to enable interference alignment (block 322). The intra-cell relative phase information may include quantized versions of complex-valued scalars $e^{j(\theta_{k1}-\theta_{kr})}$ for each row of $H_k$ or $G_k$ for each cell performing interference alignment for the UE. Equivalently, the UE may report the phase difference $\Delta\theta_{kr}$ for each row. The UE may report the complex-valued scalars and the channel norms separately. Alternatively, the UE may combine the complex-valued scalars and the channel norms and may quantize the product $\|h_k(r)\| \cdot e^{j(\theta_{k1}-\theta_{kr})}$ or $\|g_k(r)\| \cdot e^{j(\theta_{k1}-\theta_{kr})}$. Each of these quantities may be quantized individually (with scalar quantization) and grouped together (over index r) to form vectors and then quantized (with vector quantization).

One or more cells in the CoMP set may receive the hierarchical feedback of channel state information from the UE. The channel matrix for each cell may be reconstructed based on the channel state information reported by the UE. In one design, for hierarchical channel feedback, a channel vector for each row of the measured channel matrix $H_k$ for each cell may be reconstructed as follows:

$$\tilde{h}_k(r) = \|h_1(r)\| \cdot v_k(r) \cdot w_k(r) \cdot e^{j(\theta_{k1}-\theta_{kr})}, \text{ for } r=1,\ldots,R, \quad \text{Eq (14)}$$

where $\tilde{h}_k(r)$ is a reconstructed channel vector for the r-th row of $H_k$.

For hierarchical eigen-feedback, a channel vector for each row of the equivalent channel matrix $G_k$ for each cell may be reconstructed as follows:

$$\tilde{g}_k(r) = \|g_1(r)\| \cdot v_k(r) \cdot w_k(r) \cdot e^{j(\theta_{k1}-\theta_{kr})}, \text{ for } r=1,\ldots,R, \quad \text{Eq (15)}$$

where $\tilde{g}_k(r)$ is a reconstructed channel vector for the r-th row of $G_k$.

The cells may exchange reconstructed channel vectors with one another. Each cell may determine its transmit vector based on the reconstructed channel vectors for a UE being served by that cell and UE(s) for which to mitigate interference (e.g., with interference alignment).

Hierarchical feedback of channel state information may provide certain advantages. First, improved accuracy and/or efficiency may be achieved by reporting channel state information using hierarchical feedback. For example, it may be more efficient to quantize each row of a measured channel matrix $H_k$ or an equivalent channel matrix $G_k$ instead of the entire matrix. This may result in lower overhead. Second, hierarchical feedback may enable modularity of feedback, with the components to report being dependent on the desired transmission. For single-point transmission, the relative channel gain vector may be omitted and not reported. For multiple point transmission, the relative channel gain vector may be reported. For interference alignment, the intra-cell relative phase information may also be reported. Third, different components of channel state information may be reported at different rate. For example, the channel gains in $H_k$ or $G_k$ may change more frequently and may be reported more often. In contrast, the channel norms $\|h_k(r)\|$ or $\|g_k(r)\|$ may change more slowly and may be reported less frequently.

To support data transmission on the downlink without hierarchical feedback, a UE may determine a set of equivalent channels between all transmit antennas at all K cells that can serve the UE (or $$T_{total} = \sum_{k=1}^{K} T_k$$

antennas) and each receive combiner output at the UE corresponding to each stream of interest. A stream may be sent on a layer, and the terms "stream" and "layer" may be used interchangeably. Hence, the UE may report information equivalent to R unit norm extended channel vectors h(1) through h(R) for R receive combiner outputs at the UE. Each extended channel vector may represent a normalized channel between all $T_{total}$ antennas at the K cells and a single "candidate" receive combiner output at the UE corresponding to a stream of interest. Some examples of such a receiver combiner include (i) antenna selection with one receive antenna being selected, (ii) eigen-combining with a left eigenvector being used as a receive combiner vector and a corresponding right eigenvector being used as a transmit vector, or (iii) some other receiver combiner. The UE may report a large amount of information without hierarchical feedback.

With hierarchical feedback, the UE may report minimum useful information for a MIMO transmission of a given rank (M) determined by the UE instead of the entire channel matrix H. The per-stream feedback of one channel vector h(r) for each stream, which may be broken into three components:

Intra-cell short-term component (or channel gain information) comprising K complex unit norm vectors of size $T_k$, Inter-cell short-term component (or inter-cell relative channel gain information) comprising a complex unit norm vector of size K, and Inter-cell long-term component (or long-term channel gain) comprising a real, potentially unit norm, vector of size K.

The three components listed above may be obtained by treating each stream independently. Hence, inter-stream coherence information (including phase and possibly amplitude) may be missing. This inter-stream information may be provided to enable interference alignment by a cell. Furthermore, the inter-stream information may be defined as an extension of the three components listed above.

The inter-stream information to support interference alignment with enhanced hierarchical feedback may be provided in various forms. In one design, the inter-stream information may be provided in a form of either vector or scalar quantization. In one design, if the UE is reporting the three components listed above for R streams, then the inter-stream information may comprise the following:

A set of (M−1) relative phases (or intra-cell relative phase information) between the M streams (e.g., with scalar quantization), where M≦R, and A complex unit norm vector of size M that captures the relative gain between the M streams (e.g., with vector quantization).

The complex unit norm vector for the relative gain between the M streams may also be obtained from the amplitude information indicative of the amplitude of each channel vector for a cell. The two components for the inter-stream information may also be referred to as inter-stream intra-cell short-term component.

FIG. 4 shows a design of a process 400 for sending hierarchical feedback of channel state information. Process 400 may be performed by a UE (as described below) or by some other entity. The UE may determine channel gain information for a plurality of cells selectable to transmit data to the UE (block 412). These cells may belong in a CoMP set for the UE. The UE may determine intra-cell relative phase information for at least one cell among the plurality of cells (block 414). The UE may report the channel gain information and the intra-cell relative phase information (block 416). The channel gain information may comprise a plurality of quantized channel vectors for each of the plurality of cells. The intra-cell relative phase information may be indicative of phase errors in the plurality of quantized channel vectors for each of the at least one cell.

Figure 5:
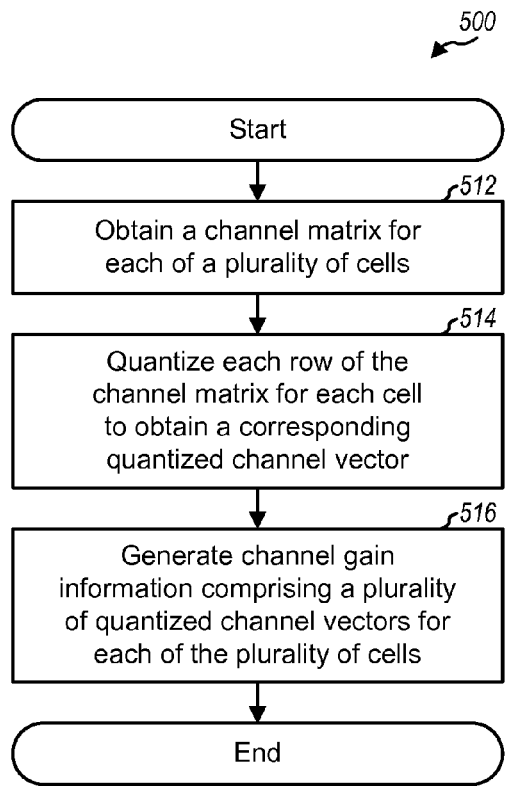
FIGS. 5 and 6 show two processes for determining channel gain information.

FIG. 5 shows a design of a process 500 for determining channel gain information based on hierarchical channel feedback. Process 500 may be used for block 412 in FIG. 4. The UE may obtain a channel matrix $H_k$ for each of the plurality of cells (block 512). The UE may quantize each row of the channel matrix for each cell to obtain a corresponding quantized channel vector $w_k(r)$, e.g., as shown in equation (2) (block 514). The quantization may be based on a codebook of channel vectors having unit magnitude. The UE may quantize each row of the channel matrix based on a metric of normalized correlation or some other metric. The UE may generate channel gain information comprising a plurality of quantized channel vectors for each of the plurality of cells (block 516).

Figure 6:
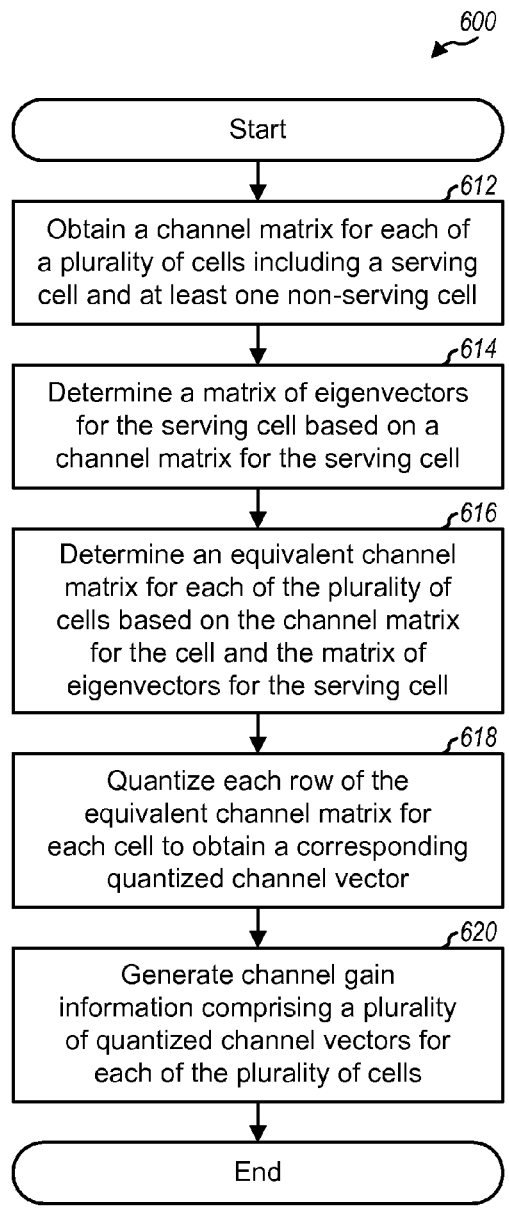

FIG. 6 shows a design of a process 600 for determining channel gain information based on hierarchical eigen-feedback. Process 600 may also be used for block 412 in FIG. 4. The UE may obtain a channel matrix $H_k$ for each of the plurality of cells, which may include a serving cell and at least one non-serving cell (block 612). The UE may determine a matrix $U_1$ of eigenvectors for the serving cell based on the channel matrix $H_1$ for the serving cell, e.g., as shown in equation (5) (block 614). The UE may determine an equivalent channel matrix $G_k$ for each of the plurality of cells based on the channel matrix for the cell and the matrix of eigenvectors for the serving cell, e.g., as shown in equation (6) (block 616). The UE may quantize each row of the equivalent channel matrix for each cell to obtain a corresponding quantized channel vector, e.g., as shown in equation (7) (block 618). The UE may generate channel gain information comprising a plurality of quantized channel vectors for each of the plurality of cells (block 620).

FIG. 7 shows a design of a process 700 for determining intra-cell relative phase information. Process 700 may be used for block 414 in FIG. 4. The UE may determine phase errors between a plurality of channel vectors $h_k$ or $g_k$ and a plurality of quantized channel vectors $w_k$ for each of at least one cell, e.g., as shown in equation (10) or (11) (block 712). The UE may determine at least one phase difference for at least one channel vector for each cell based on (i) at least one phase error for the at least one channel vector and (ii) a phase error for a designated channel vector for the cell, e.g., as shown in equation (12) or (13) (block 714). The UE may generate intra-cell relative phase information comprising the at least one phase difference for each of the at least one cell (block 716). Each phase difference for each cell may be represented by a complex-valued scalar having unit magnitude as shown in equation (12) or a delta phase as shown in equation (13).

In one design, the UE may further determine and report amplitude information for at least one of the plurality of cells. In one design, the UE may determine channel norms of a plurality of channel vectors $h_k(r)$ or $g_k(r)$ for a serving cell. The amplitude information may comprise the channel norms. In one design, the UE may separately quantize the amplitude information and the intra-cell relative phase information. In another design, the UE may jointly quantize the amplitude information and the intra-cell relative phase information.

In one design, the UE may determine and report inter-cell relative channel gain information for the plurality of cells. In one design, the UE may determine a plurality of relative channel gain vectors v(1) through v(R). Each relative channel gain vector may be determined based on a plurality of quantized channel vectors $w_1(r)$ through $w_K(r)$ for the plurality of cells. Each relative channel gain vector may be determined based further on (i) a plurality of measured channel vectors $h_1(r)$ through $h_K(r)$ for the plurality of cells, e.g., as shown in equation (3), or (ii) a plurality of equivalent channel vectors $g_1(r)$ through $g_K(r)$ for the plurality of cells, e.g., as shown in equation (8). The inter-cell relative channel gain information may comprise the plurality of relative channel gain vectors.

In one design, the UE may determine and report a plurality of long-term channel gains for the plurality of cells. The UE may determine the long-term channel gain for each cell by averaging the received power of that cell.

Referring back to FIG. 4, in one design, the UE may receive data from one or more cells among the plurality of cells (block 418). Each cell may transmit data based on at least one transmit vector, which may be determined based on the channel gain information and the intra-cell relative phase information for that cell. In one design, for interference alignment, at least two cells may transmit data based on at least two transmit vectors selected to align interference from these cells at the UE.

FIG. 8 shows a design of an apparatus 800 for sending hierarchical feedback of channel state information. Apparatus 800 includes a module 812 to determine channel gain information for a plurality of cells selectable to transmit data to a UE, a module 814 to determine intra-cell relative phase information for at least one cell among the plurality of cells, a module 816 to report the channel gain information and the intra-cell relative phase information by the UE, and a module 818 to receive data from one or more cells among the plurality of cells.

Figures 9, 10:
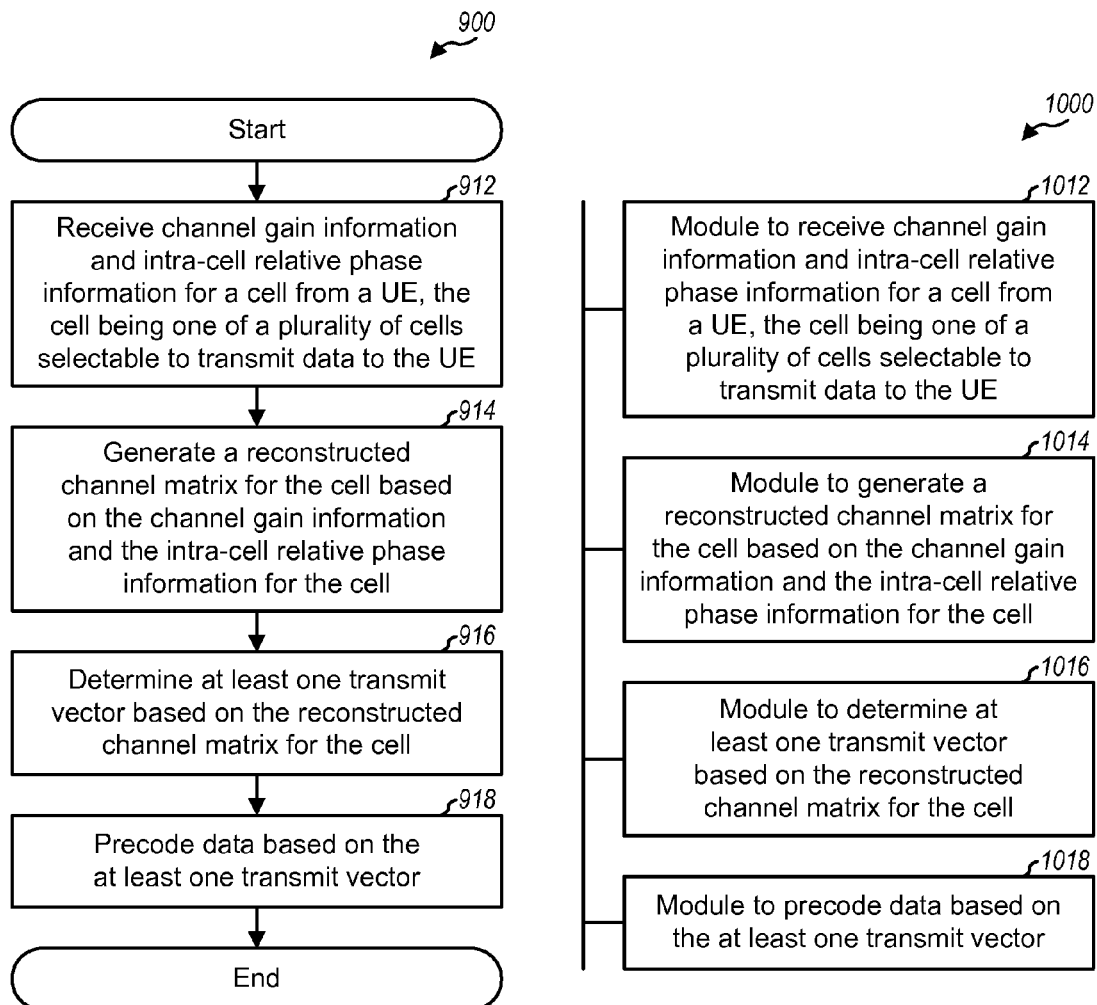
FIGS. 9 and 10 show a process and an apparatus, respectively, for receiving hierarchical feedback of channel state information.

FIG. 9 shows a design of a process 900 for receiving hierarchical feedback of channel state information. Process 900 may be performed by a cell (as described below) or by some other entity. The cell may receive channel gain information and intra-cell relative phase information for the cell from a UE (block 912). The cell may be one of a plurality of cells in a CoMP set and selectable to transmit data to the UE. The channel gain information may comprise a plurality of quantized channel vectors $w_k(1)$ through $w_k(R)$ for the cell. The intra-cell relative phase information may be indicative of phase errors in the plurality of quantized channel vectors for the cell.

The cell may generate a reconstructed channel matrix based on the channel gain information and the intra-cell relative phase information for the cell (block 914). In one design, the cell may determine a plurality of reconstructed channel vectors based on the plurality of quantized channel vectors and at least one phase difference, e.g., as shown in equation (14) or (15). The reconstructed channel matrix may comprise the plurality of reconstructed channel vectors. In one design, the reconstructed channel matrix may be an estimate of a channel matrix $H_k$ measured by the UE for the cell. In another design, the reconstructed channel matrix may be an estimate of an equivalent channel matrix $G_k$ determined by the UE for the cell.

In one design, the cell may receive amplitude information from the UE and may determine the reconstructed channel matrix based further on the amplitude information. The amplitude information may comprise channel norms, and the cell may determine each reconstructed channel vector based further on a channel norm for the reconstructed channel vector.

In one design, the cell may determine at least one transmit vector based on the reconstructed channel matrix for the cell (block 916). The cell may precode data based on the at least one transmit vector (block 918). In one design, the data may be intended for the UE, and the at least one transmit vector may steer the data toward the UE. In another design, the data may be intended for at least one other UE, and the at least one transmit vector may align interference from the cell with interference from at least one other cell at the UE.

FIG. 10 shows a design of an apparatus 1000 for sending hierarchical feedback of channel state information. Apparatus 1000 includes a module 1012 to receive channel gain information and intra-cell relative phase information for a cell from a UE, the cell being one of a plurality of cells selectable to transmit data to the UE, a module 1014 to generate a reconstructed channel matrix for the cell based on the channel gain information and the intra-cell relative phase information for the cell, a module 1016 to determine at least one transmit vector based on the reconstructed channel matrix for the cell, and a module 1018 to precode data based on the at least one transmit vector.

The modules in FIGS. 8 and 10 may comprise processors, electronic devices, hardware devices, electronic components, logical circuits, memories, software codes, firmware codes, etc., or any combination thereof.

Figure 11:
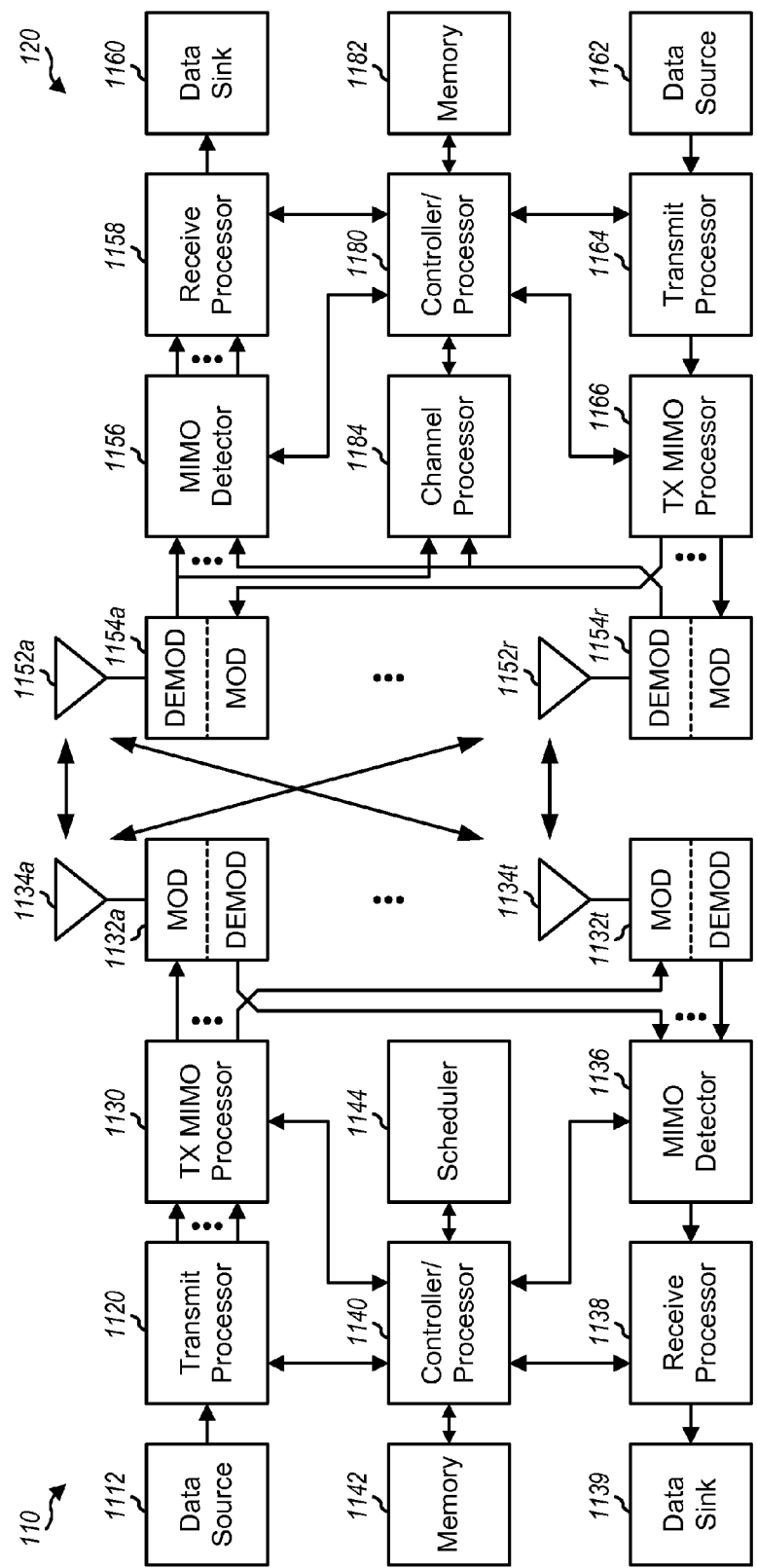
FIG. 11 shows a block diagram of a base station and a UE.

FIG. 11 shows a block diagram of a design of a base station/eNB 110 and a UE 120, which may be one of the base stations/eNBs and one of the UEs in FIG. 1. Base station 110 may serve one or more cells and may be equipped with T antennas 1134a through 1134t, where $T \geq 1$. UE 120 may be equipped with R antennas 1152a through 1152r, where $R \geq 1$.

At base station 110, a transmit processor 1120 may receive data for one or more UEs from a data source 1112, process the data for each UE based on one or more modulation and coding schemes, and provide data symbols for all UEs. Processor 1120 may also receive and process control information from a controller/processor 1140 and provide control symbols. Processor 1120 may also generate reference symbols for one or more reference signals. A transmit (TX) multiple-input multiple-output (MIMO) processor 1130 may perform pre-coding on the data symbols, the control symbols, and/or the reference symbols, if applicable, and may provide T output symbol streams to T modulators (MODs) 1132a through 1132t. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At UE 120, antennas 1152a through 1152r may receive the downlink signals from base station 110 and other base stations and may provide received signals to demodulators (DEMODs) 1154a through 1154r, respectively. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate and decode) the detected symbols, provide decoded data for UE 120 to a data sink 1160, and provide decoded control information to a controller/processor 1180.

On the uplink, at UE 120, a transmit processor 1164 may receive data from a data source 1162 and control information (e.g., channel state information) from controller/processor 1180. Processor 1164 may process (e.g., encode and modulate) the data and control information to obtain data symbols and control symbols, respectively. Processor 1164 may also generate reference symbols for one or more reference signals. The symbols from transmit processor 1164 may be precoded by a TX MIMO processor 1166 if applicable, further processed by modulators 1154a through 1154r (e.g., for SC-FDM, OFDM, etc.), and transmitted to base station 110 and possibly other base stations. At base station 110, the uplink signals from UE 120 and other UEs may be received by antennas 1134, processed by demodulators 1132, detected by a MIMO detector 1136 if applicable, and further processed by a receive processor 1138 to obtain decoded data and control information sent by UE 120 and other UEs. Processor 1138 may provide the decoded data to a data sink 1139 and the decoded control information to controller/processor 1140.

For hierarchical feedback, a channel processor 1184 at UE 120 may estimate the channel response for each cell in a CoMP set for UE 120 and may provide a channel matrix for each cell. Processor 1180 and/or 1184 may determine various components of channel state information (e.g., channel gain information, amplitude information, relative gain information, intra-cell relative phase information, etc.) based on the channel matrices for the cells in the CoMP set, as described above.

Controllers/processors 1140 and 1180 may direct the operation at base station 110 and UE 120, respectively. Processor 1140 and/or other processors and modules at base station 110 may perform or direct process 900 in FIG. 9 and/or other processes for the techniques described herein. Processor 1180 and/or other processors and modules at UE 120 may perform or direct process 300 in FIG. 3, process 400 in FIG. 4, process 500 in FIG. 5, process 600 in FIG. 6, process 700 in FIG. 7, and/or other processes for the techniques described herein. Memories 1142 and 1182 may store data and program codes for base station 110 and UE 120, respectively. A scheduler 1144 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining intra-cell relative phase information for at least one cell by a user equipment (UE); and
   reporting the intra-cell relative phase information by the UE,
   wherein the determining the intra-cell relative phase information comprises:
      determining phase errors between a plurality of channel vectors and a plurality of quantized channel vectors for each of the at least one cell;
      determining at least one phase difference for at least one channel vector for each cell based on at least one phase error for the at least one channel vector and a phase error for a designated channel vector for the cell; and
      generating the intra-cell relative phase information comprising the at least one phase difference for each of the at least one cell.

2. The method of claim 1, wherein each phase difference for each cell is represented by a complex-valued scalar having unit magnitude.

3. The method of claim 1, wherein a number of phase differences for each cell is dependent on a rank for data transmission to the UE.

4. The method of claim 1, further comprising:
   determining channel gain information for a plurality of cells including the at least one cell; and
   reporting the channel gain information by the UE.

5. The method of claim 4, further comprising:
   determining amplitude information for the at least one cell; and
   reporting the amplitude information by the UE.

6. The method of claim 5, wherein the determining the amplitude information comprises:
   determining channel norms of a plurality of channel vectors for a cell; and generating the amplitude information comprising the channel norms of the cell.

7. The method of claim 5, further comprising:
jointly quantizing the amplitude information and the intra-cell relative phase information.

8. The method of claim 4, further comprising:
determining inter-cell relative channel gain information for the plurality of cells; and
reporting the inter-cell relative channel gain information by the UE.

9. The method of claim 4, further comprising:
determining a plurality of long-term channel gains for the plurality of cells; and
reporting the plurality of long-term channel gains by the UE.

10. The method of claim 4, further comprising:
receiving data from one or more cells among the plurality of cells, each of the one or more cells transmitting data based on at least one transmit vector determined based on channel gain information and intra-cell relative phase information for the cell.

11. The method of claim 4, wherein at least two cells among the plurality of cells transmit data based on at least two transmit vectors determined based on the channel gain information and the intra-cell relative phase information to align interference from the at least two cells at the UE.

12. A method for wireless communication, comprising:
determining intra-cell relative phase information for at least one cell by a user equipment (UE);
reporting the intra-cell relative phase information by the UE;
determining channel gain information for a plurality of cells including the at least one cell; and
reporting the channel gain information by the UE,
wherein the channel gain information comprises a plurality of quantized channel vectors for each of the plurality of cells, and wherein the intra-cell relative phase information is indicative of phase errors in the plurality of quantized channel vectors for each of the at least one cell.

13. A method for wireless communication, comprising:
determining intra-cell relative phase information for at least one cell by a user equipment (UE);
reporting the intra-cell relative phase information by the UE;
determining channel gain information for a plurality of cells including the at least one cell; and
reporting the channel gain information by the UE,
wherein the determining the channel gain information comprises:
obtaining a channel matrix for each of the plurality of cells;
quantizing each row of the channel matrix for each cell to obtain a corresponding quantized channel vector; and
generating the channel gain information comprising a plurality of quantized channel vectors for each of the plurality of cells.

14. The method of claim 13, wherein each row of the channel matrix for each cell is quantized based on a codebook of channel vectors having unit magnitude.

15. The method of claim 13, wherein the quantizing each row of the channel matrix comprises quantizing each row of the channel matrix based on a metric of normalized correlation.

16. A method for wireless communication, comprising:
determining intra-cell relative phase information for at least one cell by a user equipment (UE);
reporting the intra-cell relative phase information by the UE;
determining channel gain information for a plurality of cells including the at least one cell; and
reporting the channel gain information by the UE,
wherein the determining the channel gain information comprises:
obtaining a channel matrix for each of the plurality of cells, the plurality of cells including a serving cell and at least one non-serving cell;
determining a matrix of eigenvectors for the serving cell based on a channel matrix for the serving cell;
determining an equivalent channel matrix for each of the plurality of cells based on the channel matrix for the cell and the matrix of eigenvectors for the serving cell;
quantizing each row of the equivalent channel matrix for each cell to obtain a corresponding quantized channel vector; and
generating the channel gain information comprising a plurality of quantized channel vectors for each of the plurality of cells.

17. A method for wireless communication, comprising:
determining intra-cell relative phase information for at least one cell by a user equipment (UE);
reporting the intra-cell relative phase information by the UE;
determining channel gain information for a plurality of cells including the at least one cell;
reporting the channel gain information by the UE;
determining inter-cell relative channel gain information for the plurality of cells; and
reporting the inter-cell relative channel gain information by the UE,
wherein the determining the inter-cell relative channel gain information comprises:
determining a plurality of relative channel gain vectors, each relative channel gain vector being determined based on a plurality of quantized channel vectors for the plurality of cells; and
generating the inter-cell relative channel gain information comprising the plurality of relative channel gain vectors.

18. The method of claim 17, wherein each relative channel gain vector is determined based further on a plurality of measured channel vectors or a plurality of equivalent channel vectors for the plurality of cells.

19. An apparatus for wireless communication, comprising:
means for determining intra-cell relative phase information for at least one cell, the means for determining intra-cell relative phase information comprising:
means for determining phase errors between a plurality of channel vectors and a plurality of quantized channel vectors for each of the at least one cell,
means for determining at least one phase difference for at least one channel vector for each cell based on at least one phase error for the at least one channel vector and a phase error for a designated channel vector for the cell, and
means for generating the intra-cell relative phase information comprising the at least one phase difference for each of the at least one cell; and
means for reporting the intra-cell relative phase information.

20. The apparatus of claim 19, further comprising:
means for determining channel gain information for a plurality of cells including the at least one cell; and
means for reporting the channel gain information.

21. The apparatus of claim 20, further comprising:
means for receiving data from one or more cells among the plurality of cells, each of the one or more cells transmitting data based on at least one transmit vector determined based on channel gain information and intra-cell relative phase information for the cell.

22. The apparatus of claim 20, wherein at least two cells among the plurality of cells transmit data based on at least two transmit vectors determined based on the channel gain information and the intra-cell relative phase information to align interference from the at least two cells at the apparatus.

23. An apparatus for wireless communication, comprising:
means for determining intra-cell relative phase information for at least one cell;
means for reporting the intra-cell relative phase information;
means for determining channel gain information for a plurality of cells including the at least one cell; and
means for reporting the channel gain information,
wherein the means for determining the channel gain information comprises:
means for obtaining a channel matrix for each of the plurality of cells;
means for quantizing each row of the channel matrix for each cell to obtain a corresponding quantized channel vector; and
means for generating the channel gain information comprising a plurality of quantized channel vectors for each of the plurality of cells.

24. An apparatus for wireless communication, comprising:
means for determining intra-cell relative phase information for at least one cell;
means for reporting the intra-cell relative phase information;
means for determining channel gain information for a plurality of cells including the at least one cell, wherein the means for determining the channel gain information comprises:
means for obtaining a channel matrix for each of the plurality of cells, the plurality of cells including a serving cell and at least one non-serving cell;
means for determining a matrix of eigenvectors for the serving cell based on a channel matrix for the serving cell;
means for quantizing each row of the equivalent channel matrix for each cell to obtain a corresponding quantized channel vector; and
means for generating the channel gain information comprising a plurality of quantized channel vectors for each of the plurality of cells; and
means for reporting the channel gain information.

25. An apparatus for wireless communication, comprising:
at least one processor configured to:
determine intra-cell relative phase information for at least one cell;
report the intra-cell relative phase information;
determine phase errors between a plurality of channel vectors and a plurality of quantized channel vectors for each of the at least one cell;
determine at least one phase difference for at least one channel vector for each cell based on at least one phase error for the at least one channel vector and a phase error for a designated channel vector for the cell; and
generate the intra-cell relative phase information comprising the at least one phase difference for each of the at least one cell.

26. The apparatus of claim 25, wherein the at least one processor is configured to determine channel gain information for a plurality of cells including the at least one cell, and to report the channel gain information.

27. The apparatus of claim 26, wherein the at least one processor is further configured to receive data from one or more cells among the plurality of cells, each of the one or more cells transmitting data based on at least one transmit vector determined based on channel gain information and intra-cell relative phase information for the cell.

28. The apparatus of claim 26, wherein at least two cells among the plurality of cells transmit data based on at least two transmit vectors determined based on the channel gain information and the intra-cell relative phase information to align interference from the at least two cells at the apparatus.

29. An apparatus for wireless communication, comprising:
at least one processor configured to:
determine intra-cell relative phase information for at least one cell;
report the intra-cell relative phase information;
determine channel gain information for a plurality of cells including the at least one cell;
report the channel gain information;
obtain a channel matrix for each of the plurality of cells;
quantize each row of the channel matrix for each cell to obtain a corresponding quantized channel vector; and
generate the channel gain information comprising a plurality of quantized channel vectors for each of the plurality of cells.

30. An apparatus for wireless communication, comprising:
at least one processor configured to:
determine intra-cell relative phase information for at least one cell;
report the intra-cell relative phase information;
determine channel gain information for a plurality of cells including the at least one cell;
report the channel gain information;
obtain a channel matrix for each of a plurality of cells, the plurality of cells including a serving cell and at least one non-serving cell;
determine a matrix of eigenvectors for the serving cell based on a channel matrix for the serving cell;
determine an equivalent channel matrix for each of the plurality of cells based on the channel matrix for the cell and the matrix of eigenvectors for the serving cell;
quantize each row of the equivalent channel matrix for each of the plurality of cells to obtain a corresponding quantized channel vector; and
generate the channel gain information comprising a plurality of said quantized channel vectors.

31. A computer program product, comprising:
a non-transitory computer-readable medium comprising:
code for causing at least one computer to determine intra-cell relative phase information for at least one cell by a user equipment (UE), and
code for causing the at least one computer to report the intra-cell relative phase information by the UE,
wherein the determining the intra-cell relative phase information comprises:
determining phase errors between a plurality of channel vectors and a plurality of quantized channel vectors for each of the at least one cell;
determining at least one phase difference for at least one channel vector for each cell based on at least one phase error for the at least one channel vector and a phase error for a designated channel vector for the cell; and generating the intra-cell relative phase information comprising the at least one phase difference for each of the at least one cell.

32. An apparatus for wireless communication, comprising:
means for determining intra-cell relative phase information for at least one cell;
means for reporting the intra-cell relative phase information;
means for determining channel gain information for a plurality of cells including the at least one cell; and
means for reporting the channel gain information,
wherein the channel gain information comprises a plurality of quantized channel vectors for each of the plurality of cells, and wherein the intra-cell relative phase information is indicative of phase errors in the plurality of quantized channel vectors for each of the at least one cell.

33. An apparatus for wireless communication, comprising:
means for determining intra-cell relative phase information for at least one cell;
means for reporting the intra-cell relative phase information;
means for determining channel gain information for a plurality of cells including the at least one cell;
means for reporting the channel gain information;
means for determining inter-cell relative channel gain information for the plurality of cells; and
means for reporting the inter-cell relative channel gain information,
wherein the means for determining the inter-cell relative channel gain information comprises:
means for determining a plurality of relative channel gain vectors, each relative channel gain vector being determined based on a plurality of quantized channel vectors for the plurality of cells; and
means for generating the inter-cell relative channel gain information comprising the plurality of relative channel gain vectors.

34. An apparatus for wireless communication, comprising:
at least one processor configured to:
determine intra-cell relative phase information for at least one cell;
report the intra-cell relative phase information;
determine channel gain information for a plurality of cells including the at least one cell; and
report the channel gain information,
wherein the channel gain information comprises a plurality of quantized channel vectors for each of the plurality of cells, and wherein the intra-cell relative phase information is indicative of phase errors in the plurality of quantized channel vectors for each of the at least one cell.

35. An apparatus for wireless communication, comprising:
at least one processor configured to:
determine intra-cell relative phase information for at least one cell;
report the intra-cell relative phase information;
determine channel gain information for a plurality of cells including the at least one cell;
report the channel gain information;
determine inter-cell relative channel gain information for the plurality of cells; and
report the inter-cell relative channel gain information,
wherein determining the inter-cell relative channel gain information comprises:
determining a plurality of relative channel gain vectors, each relative channel gain vector being determined based on a plurality of quantized channel vectors for the plurality of cells; and
generating the inter-cell relative channel gain information comprising the plurality of relative channel gain vectors.

36. A computer program product, comprising:
a non-transitory computer-readable medium comprising:
code for causing at least one computer to determine intra-cell relative phase information for at least one cell;
code for causing the at least one computer to report the intra-cell relative phase information;
code for causing the at least one computer to determine channel gain information for a plurality of cells including the at least one cell; and
code for causing the at least one computer to report the channel gain information,
wherein the channel gain information comprises a plurality of quantized channel vectors for each of the plurality of cells, and wherein the intra-cell relative phase information is indicative of phase errors in the plurality of quantized channel vectors for each of the at least one cell.

37. A computer program product, comprising:
a non-transitory computer-readable medium comprising:
code for causing at least one computer to determine intra-cell relative phase information for at least one cell;
code for causing the at least one computer to report the intra-cell relative phase information;
code for causing the at least one computer to determine channel gain information for a plurality of cells including the at least one cell; and
code for causing the at least one computer to report the channel gain information,
wherein the determining the channel gain information comprises:
obtaining a channel matrix for each of the plurality of cells;
quantizing each row of the channel matrix for each cell to obtain a corresponding quantized channel vector; and
generating the channel gain information comprising a plurality of quantized channel vectors for each of the plurality of cells.

38. A computer program product, comprising:
a non-transitory computer-readable medium, comprising:
code for causing at least one computer to determine intra-cell relative phase information for at least one cell;
code for causing the at least one computer to report the intra-cell relative phase information;
code for causing the at least one computer to determine channel gain information for a plurality of cells including the at least one cell; and
code for causing the at least one computer to report the channel gain information,
wherein the determining the channel gain information comprises:
obtaining a channel matrix for each of the plurality of cells, the plurality of cells including a serving cell and at least one non-serving cell;

determining a matrix of eigenvectors for the serving cell based on a channel matrix for the serving cell;

determining an equivalent channel matrix for each of the plurality of cells based on the channel matrix for the cell and the matrix of eigenvectors for the serving cell;

quantizing each row of the equivalent channel matrix for each cell to obtain a corresponding quantized channel vector; and generating the channel gain information comprising a plurality of quantized channel vectors for each of the plurality of cells.

39. A computer program product, comprising:

a non-transitory computer-readable medium, comprising:

code for causing at least one computer to determine intra-cell relative phase information for at least one cell;

code for causing the at least one computer to report the intra-cell relative phase information;

code for causing the at least one computer to determine channel gain information for a plurality of cells including the at least one cell;

code for causing the at least one computer to report the channel gain information;

code for causing the at least one computer to determine inter-cell relative channel gain information for the plurality of cells; and code for causing the at least one computer to report the inter-cell relative channel gain information, wherein the determining the inter-cell relative channel gain information comprises:

determining a plurality of relative channel gain vectors, each relative channel gain vector being determined based on a plurality of quantized channel vectors for the plurality of cells; and generating the inter-cell relative channel gain information comprising the plurality of relative channel gain vectors.

* * * * *